United States Patent [19]

Crane et al.

[11] 3,930,229

[45] Dec. 30, 1975

[54] HANDWRITING SYSTEM

[75] Inventors: Hewitt David Crane, Portola Valley; Robert Ellis Savoie, Mountain View, both of Calif.

[73] Assignee: Stanford Research Institute, Menlo Park, Calif.

[22] Filed: Jan. 31, 1974

[21] Appl. No.: 438,413

[52] U.S. Cl............... 340/146.3 SY; 340/146.3 MA

[51] Int. Cl.$^2$ .......................................... G06K 9/00

[58] Field of Search ........ 340/146.3 SY, 146.3 MA, 340/146.3 SG, 172.5

[56] References Cited

UNITED STATES PATENTS

| | | | |
|---|---|---|---|
| 3,145,367 | 8/1964 | Crane | 340/146.3 SY |
| 3,199,078 | 8/1965 | Gaffney et al. | 340/146.3 SY |

OTHER PUBLICATIONS

Teitelman, "Real Time Recognition of Hand-Drawn Characters", *Proc.-Fall Joint Computer Conference*, 1964, pp. 559-575.

*Primary Examiner*—Leo H. Boudreau
*Attorney, Agent, or Firm*—Lindenberg, Freilich, Wasserman, Rosen & Fernandez

[57] ABSTRACT

A system for identifying handwritten characters is provided wherein a pen and associated circuitry generate a sequence of signals representing a sequence of directions which is taken to write each character. The sequence of signals is applied to a logic circuit arrangement which, in response to the signal sequence generated in writing a character, produces a set of digital signals uniquely representative of said character.

11 Claims, 17 Drawing Figures

HANDWRITING SYSTEM

BACKGROUND OF THE INVENTION

This invention relates to a system used for recognizing handwritten characters as they are being written and generating a set of digital signals uniquely identifying a character.

A system for converting each character of a hand printed message, as it is being written, to a set of signals which are standard and which uniquely identify each character of the handwritten message, has many uses. These signals may be compactly recorded, transmitted, entered directly into a computer, or even used to operate a typewriter. In a U.S. Pat. No. 3,145,367 there is described a system in which a sequence of signals is generated by a pen each representing a direction being taken in printing a character with said pen. Each signal in the sequence excites a separate line. A shift register is provided for each character to be recognized. The lines are connected to the shift registers in a manner so that only one shift register has a "one" shifted therethrough in response to a particular sequence of excitation of the lines, whereby the output from that shift register identifies the character which was written.

While this system is operative, its implementation for a recognition system of any size is complicated and costly.

OBJECTS AND SUMMARY OF THE INVENTION

An object of this invention is to provide a novel and useful system for generating handwritten, character identification signals as the character is being written.

A further object of this invention is to provide a system for generating handwritten character identification signals which is less expensive and simpler than previously existing systems.

The foregoing and other objects of the invention are achieved in an arrangement wherein a pen and associated circuitry generate a sequence of signals in response to a handwritten character indicative of the directions being taken in writing that character. These signals are applied to recognition circuitry including a read-only memory. The sequence of direction signals are converted into part of a memory address signal, the other part of which is provided by the memory at the memory location established by the last complete memory address. In this manner, as a character is written, the memory is sequentially addressed until, as the end of the character is written, the memory output will comprise digital signals uniquely representing the character. These signals may be in the ASCII character code, for example.

DESCRIPTION OF THE PREFERRED EMBODIMENTS

The present application permits character identification by disregarding directions which are irrelevant to the ultimate recognition decision. This provides not only much greater freedom in making letters, but also a great reduction in the size of the recognition logic. It is based on the use of a logical arrangement which resembles a tree structure through which one sequences in response to direction signals generated in the writing process.

THEORY OF THE INVENTION

As will be described in more detail later herein, the special pen and associated circuits used with the present invention provides one of six output signals respectively pen-up, up, right, down, left, and zone. If the pen is not touching the paper, the pen-up signal is high and all other signals are low. If the pen is not up, but pressing down with a force greater than some adjustable level, then one of the other five signals is high and the remaining four are low. Thus, at any time, only one pen output is high. The four direction signals (up, right, down, left) indicate the instantaneous directions of motions of the pen quantized into these four sectors. The decision of which signal is active is made by the circuitry which immediately follows the pen. As indicated, this will be described in more detail subsequently herein.

Figure 7:
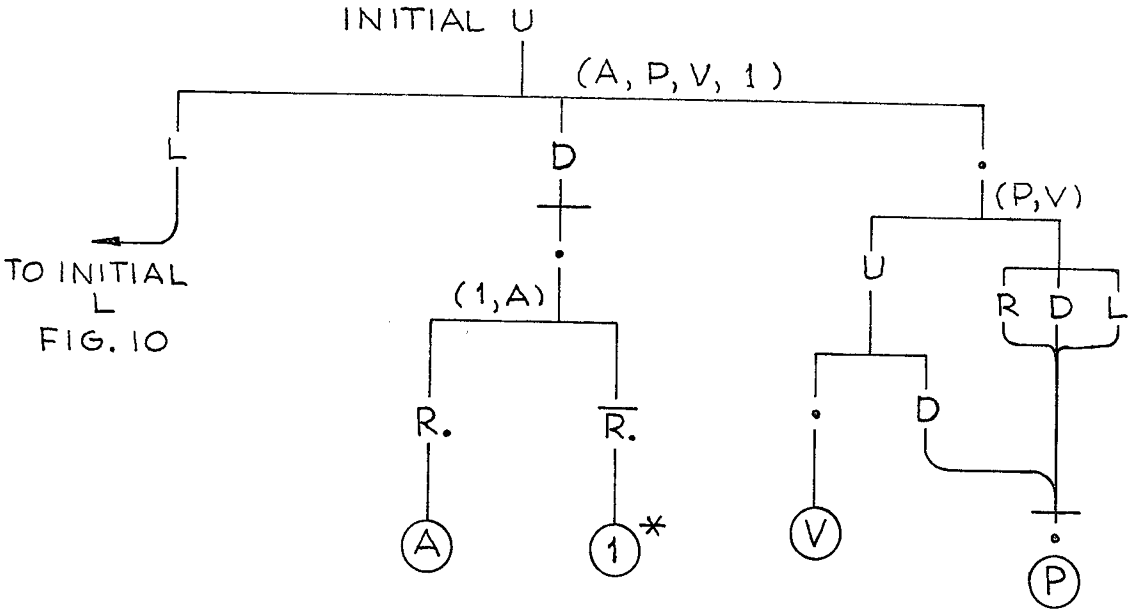
FIGS. 7, 8, 9, and 10 are flow diagrams representing the manner in which direction sequences, followed in writing characters, may be utilized to uniquely identify a character.
Figure 8:
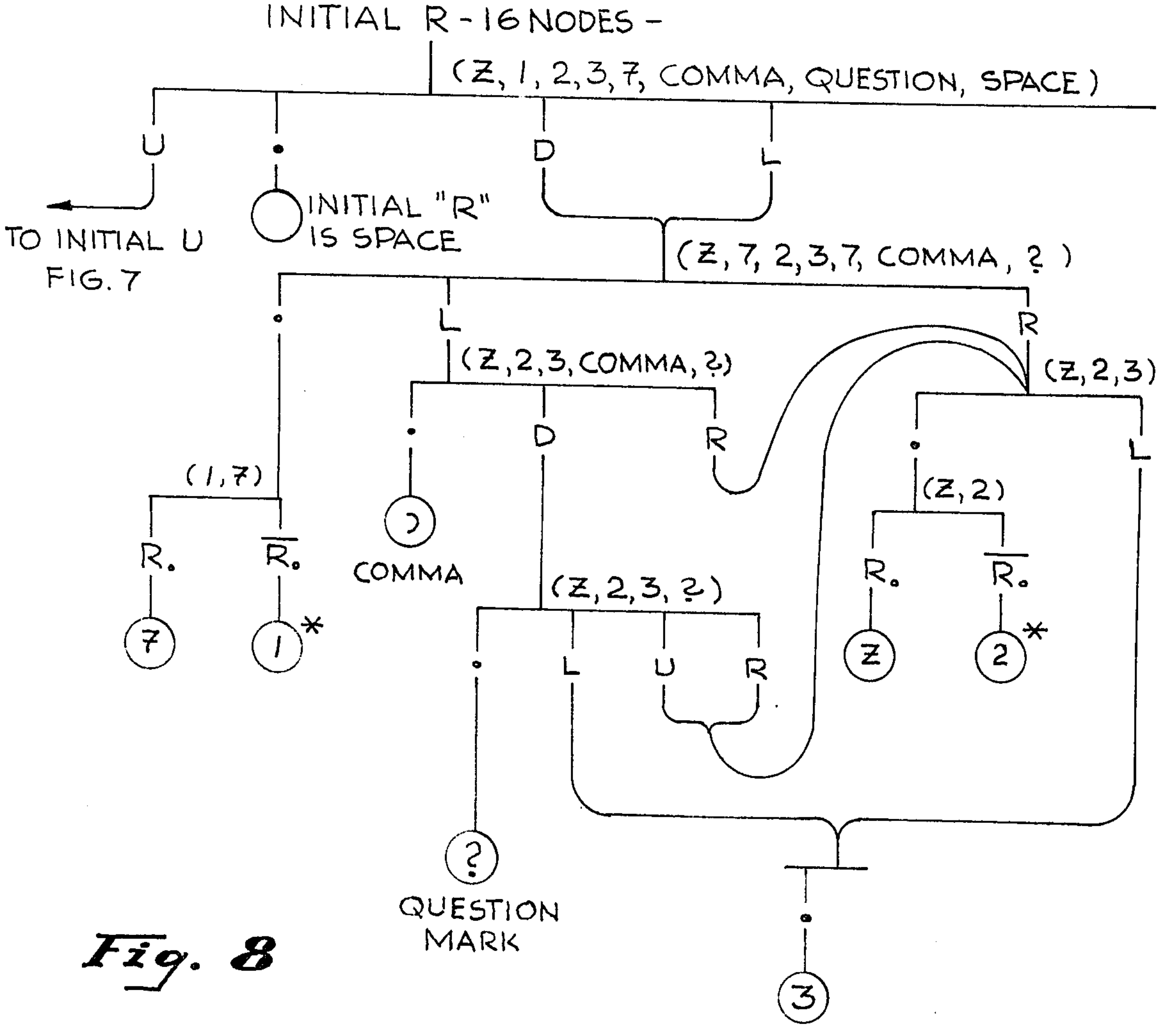
Figure 9:
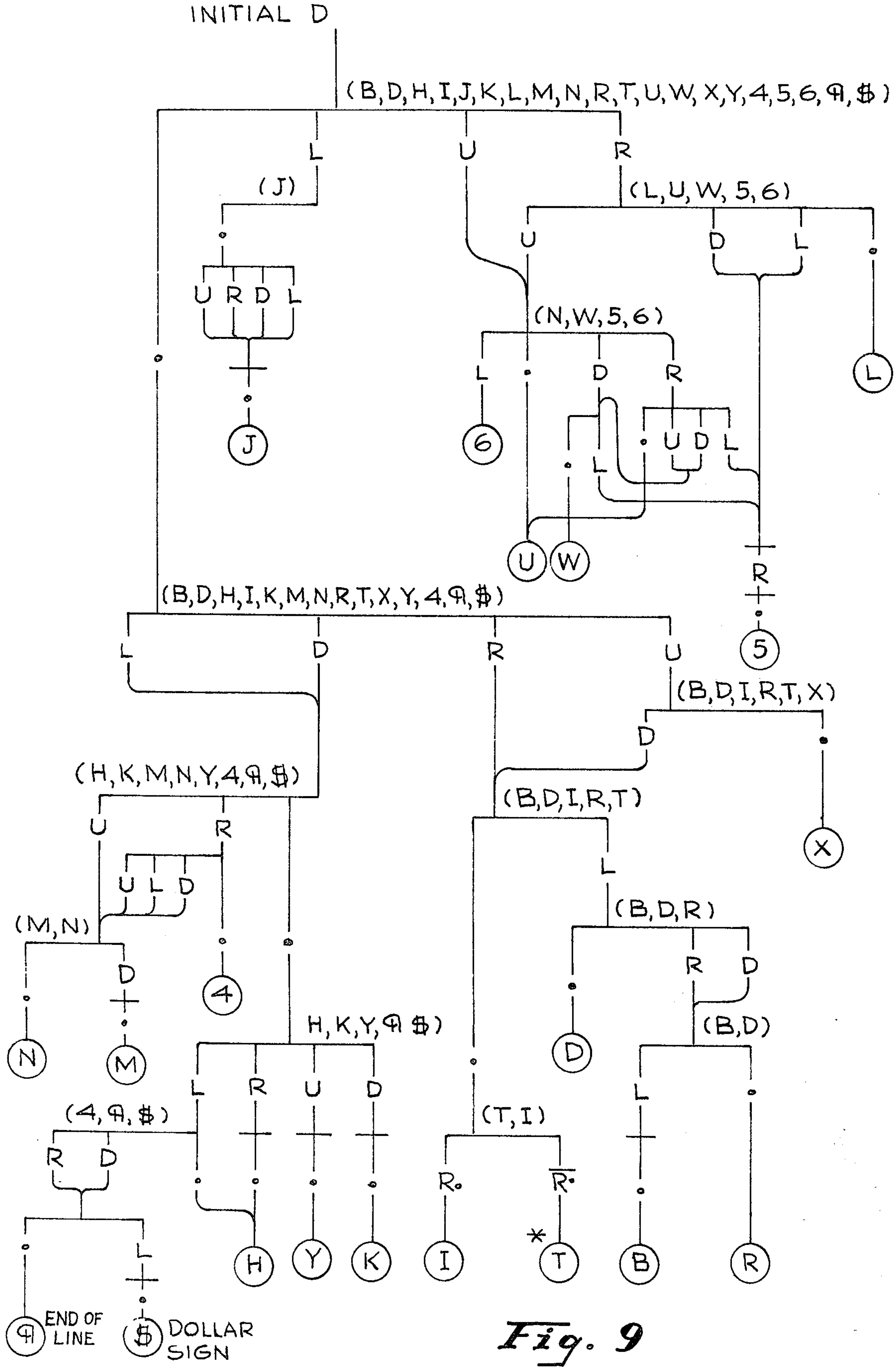
Figure 10:
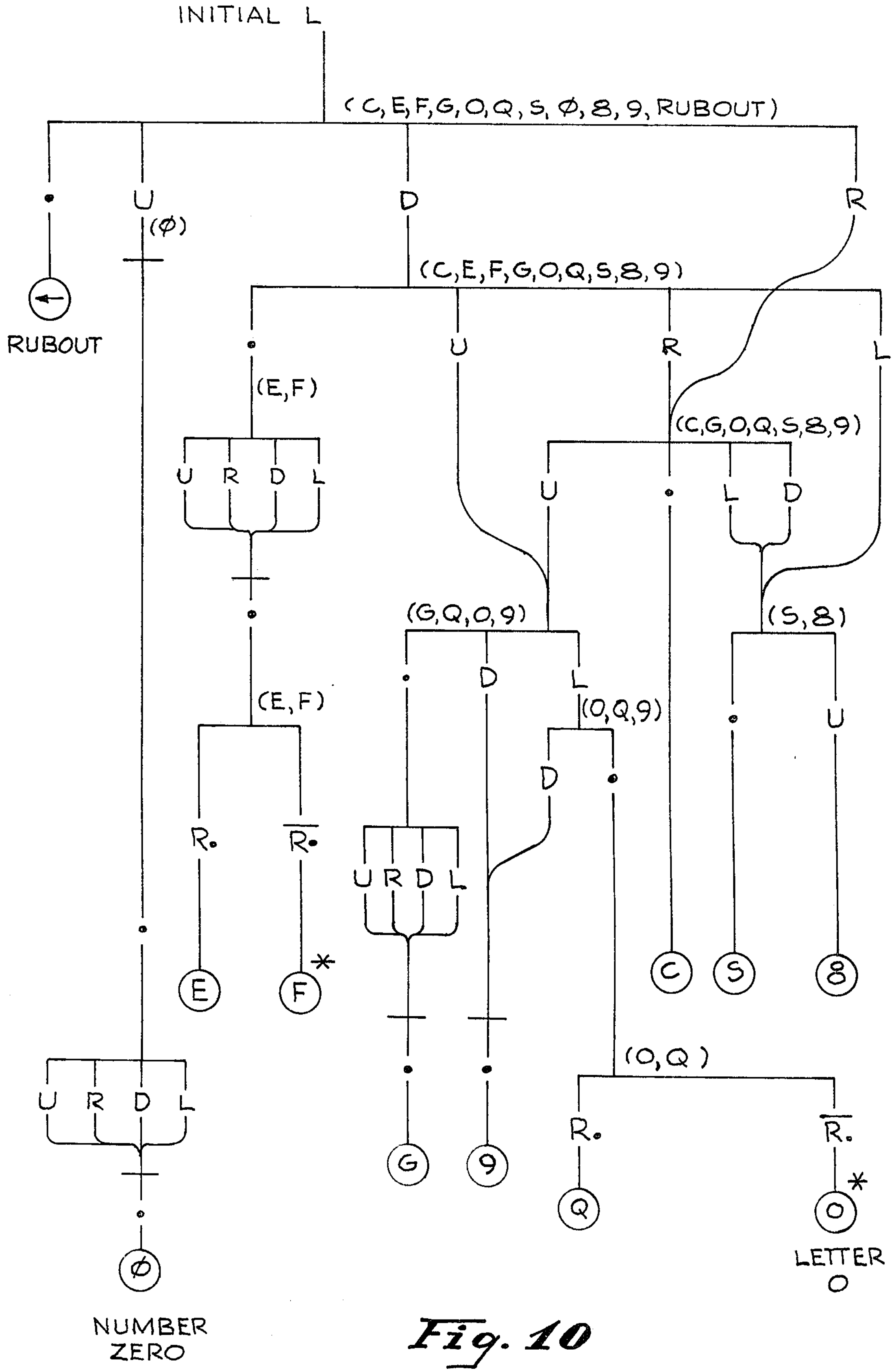
Figures 11, 12:
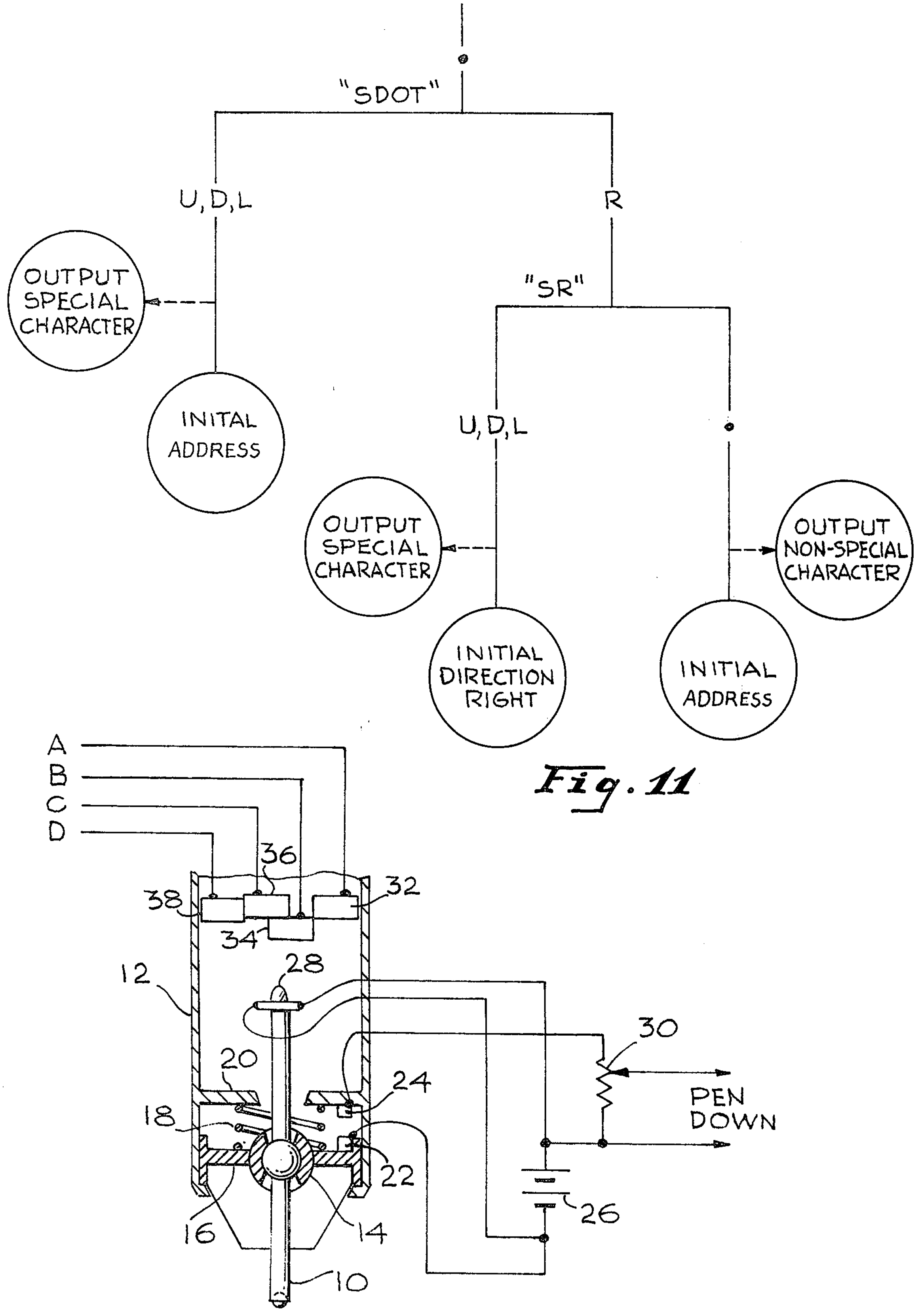
FIG. 11 illustrates a flow diagram for determining whether or not a special character has been written.
FIG. 12 is a schematic view of a type of pen suitable for use with this invention.

FIGS. 7–11 herein represent the "trees" or sequences of directions generated in writing a character. The FIG. 7 tree or sequence is entered into when the first writing stroke is up (hereafter designated by U). FIG. 8 represents a tree for a directional sequence when the first writing stroke is right (represented by R). FIG. 9 is the tree sequence entered into when the first writing stroke is down, (D). FIG. 10 is the tree sequence entered into when the first writing stroke is L or left. FIG. 11 is the tree sequence entered into when a special case character is encountered, which will be described subsequently herein.

Figure 1:
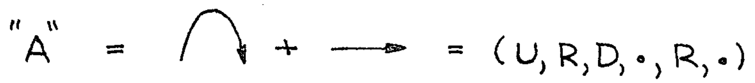
FIG. 1 is an illustration of how a unique set of directions characterize a handwritten character.

Exemplary of how the recognition process of this invention proceeds, the logic of the recognition of the letter A, as shown in FIG. 1, will be described. In all of the following description, a dot (.) as a direction, symbolizes a pen lift. A first U stroke energizes the U branch of the tree shown in FIG. 7. Once on this branch the system is committed to recognition only of an A, P, V, or 1. That is, although other parts of the tree are re-entrant, there is no way to get back to the beginning of the tree other than through an abort or a letter recognition.

In the tree drawings in FIGS. 7 through 11, the junction of a branch, represented as a vertical line, with a horizontal line, using FIG. 7 as an example, is called a node. Further progress from the first node, reached after the initial "U" signal, along a particular tree will occur only in response to the occurrence of one of the three signals, namely L, D or dot. As far as other trees shown herein are concerned, progress from any node of the tree occurs in response to activation of one of the directions, other than the one that brings one to the node, which directions are shown on branches extending from the particular node.

In the present case, i.e., after the occurrence of a U stroke, an R following the U is ignored, but a (D,.) — i.e., a down stroke and a pen lift — brings one irreversibly to the (1,A) node of this particular tree. In other words, a (U, D,.) sequence is sufficient to bring one irreversibly to a node from which one will either recognize a 1 or an A. In the implementation of this invention, a 1 also starts with an up stroke, (short), followed by a down stroke, (as may be seen from FIG. 3). The next problem then is to be able to distinguish a 1 from an A.

Figure 2:
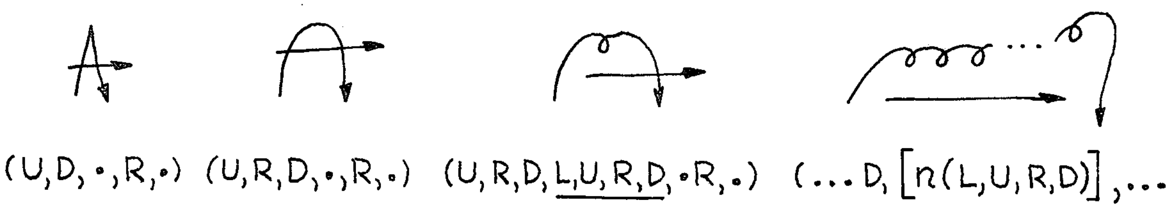
FIG. 2 illustrates variations in writing a handwritten character which can still be identified as that specific character.

The same technique for distinguishing between a 1 and an A is used in several places throughout the coding scheme employed herein. It is based upon the (arbitrary) constraint that no character is normally permitted to begin with a (R,.) sequence: i.e., a simple right stroke followed by a pen lift. Rather, an (R,.) sequence is treated automatically as the end of a character rather than the beginning of a new character. [An (R,.) sequence is also treated as a spare character, as will be discussed later herein.] In the case of a 1 and A, an (R,.) sequence following the (U,D,1) sequence will signal an A; anything else but an (R,.) will signal a 1. Thus, all of the characters shown in FIG. 2 will be recognized as an A. The inner loop (L,U,R,D) in the third representation is a sequence of ignorable directions. As suggested in the last sketch shown in FIG. 2, an arbitrary number of inner loops [i.e., N(L,U,R,D)] will also be ignored.

Figure 3:
FIG. 3 illustrates some variations of a handwritten character which are identified as a "special character".

The characters shown in FIG. 3 on the other hand will be recognized as a 1. They will not normally be signalled until the beginning of the following character. For example, considering the character sequence (1,2), the 1 would be signaled as soon as the initial right stroke of the 2 turns to a down stroke. That is, a sequence (R,D) at the beginning of the 2 is an example of "anything else but (R,.)", which results immediately in a selection of a 1 for the last character, while the processing of the current character continues. From the foregoing description the significance of the $\overline{R}$,. shown in the 1 branch should be understood as meaning, "anything but (R,.)". Characters, such as a 1, are designated as special case characters. In writing a special case character, one generates almost all of the direction signals, and in the same sequence, as is generated in writing another character.

Figure 4:
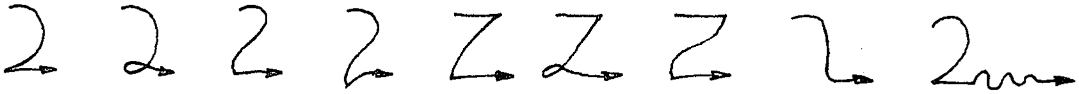
FIG. 4 illustrates some variations in the writing of another "special character" such as the number 2.

Considering now, FIG. 8, it will be seen that in this particular implementation a similar problem exists in connection with distinguishing a Z from a 2 and a 1 from a 7. [The digit 1 can start with an initial U stroke, in which case it runs into conflict with the letter A, as described previously, but it can also begin with an initial R stroke, in which case it runs into conflict with the digit 7, as described here. Both the A and 7 require a subsequent right stroke — i.e., (R,.).] FIG. 4 represents different writings of 2 which will be recognized as a 2. However, the sequence which occurs in writing a 2 (R,[D or L],R,.) activates the branches of the tree up until the (Z,2) node, because the only difference between a Z and a 2 (in the configuration shown) is that a Z requires a final cross stroke. If no cross stroke is made and the next character is begun, then the 2 branch of the tree is activated and the output from the tree will be digital signals representative of 2. However, if a cross stroke (R,.) occurs, then the Z branch is energized and the output signals will represent a Z. Thus, when the digits 123, are written, the 1 will be recognized just after the start of the 2, as described above, and the 2 will be recognized just after the start of the 3. In the case of the 7 and the 1, the 1 is recognized just after the start of the next character in similar fashion as has been described.

In FIG. 8, the connection between two branches and the node adjacent which the (Z 2 3) is shown, on the right side of the drawing, illustrates the re-entrant nature of the tree. Thus, a sequence (R,D,L,.) is recognized as a comma, (a backward C). But if a down stroke (D) follows the (R,D,L), sequence, it will be recognized as a "?" if followed immediately by a pen lift, otherwise the energization sequence re-enters the node at the (Z,2,3) branch and waits for the next direction signal. If after (R,D,L) and (R) occurs the energization sequence arrives at the (Z,2,3) also and waits for the next direction signal. The paralleling of branches should also be noted. Thus, a D or L following the initial R goes to the same branch point or node. This permits a "flat" Z — i.e., (R,L,R,.) — or an accutely shaped comma — (R,L,.).

Figure 5:
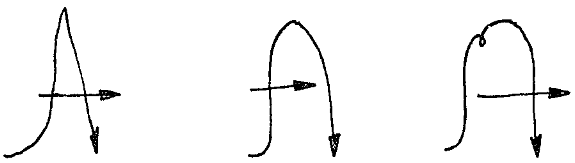
FIG. 5 shows some further variations in the writing of the letter A, which along with those shown in FIG. 2, will still be identified as an A when a number of directions taken in writing are disregarded.

In the alphabet set being used here, there are no characters that begin with the sequence (R,U, . . .). Thus, the U branch following the "initial R" shown in FIG. 8, connects back to the initial U branch of the tree shown in FIG. 7. This allows an "initial U" stroke to be preceded by a small (or not so small) precursor (namely an R) which will be treated as an ignorable direction. Accordingly, to the list of allowed A shapes shown in FIG. 2, can be added by way of example, an allowed right stroke as shown in FIG. 5 for the letter A.

Figure 6:
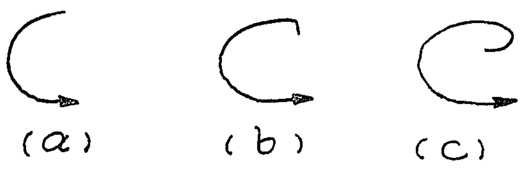
FIGS. 6*a*, 6*b* and 6*c* illustrate some variations in the writing of the letter C, which can be tolerated within a system which disregards certain writing directions.

Carrying this one step further, it should be noted that there are also no sequences that begin (U,L, . . .). Accordingly, the L branch of the U tree shown in FIG. 7 connects back to the initial L branch shown in FIG. 10. Hence, although the letter C has the nominal sequence (L,D,R,.) as represented by FIG. 6A, the sequences (U,L,D,R,.) and (R,U,L,D,R,.), shown in FIG. 6B and FIG. 6C will also be recognized as a C through the initial U path connecting FIG. 8 to FIG. 7 and also through the initial L path connecting FIG. 7 with FIG. 10.

From the foregoing it should be clear that each character may be made many ways with the type of logic described herein, without having to program each as a specific sequence. Alternatively, there is room to define many more symbols, For example, the C with an initial up stroke, as represented in FIG. 6B, or initial R,U stroke as shown in FIG. 6C could each be defined as different characters.

From the foregoing description, it should be readily apparent how one could pass from an initial entrance point into any one of the tree logic drawings shown in FIGS. 7, 8, 9, and 10 through the various nodes and branches of the tree until the end point in which the specific character being written is recognized. Note that at each node of the tree there is noted adjacent thereto the recognition possibilities which follow from that node. Each branch of the tree has inserted therein, the direction or pen uplift which activates that branch, following arrival at the preceding node.

IMPLEMENTATION OF LOGIC

The implementation of the logic represented by the trees shown in FIGS. 7–10 is accomplished, by way of example, and in accordance with this invention, by using a read-only memory (ROM), which is programmed to contain the logical branchings shown in the trees.

Characters are recognized by using one of two methods. The first method is used for the majority of characters and is called "main sequence recognition". An example of a character recognized by the "main sequence" is the letter C. The sequence (L,D,R), as shown in FIG. 10, brings one to a node from which characters (C,G,O,Q,S,8,9,) may be recognized. If the pen is lifted at this point whereby the sequence becomes (L,D,R,.), the sequence is immediately recognized as a C. All "main sequence" characters are thus recognized at the time of the pen-up ("."), that terminates their writing.

Non-main sequence characters (e.g., F,O,1,2,) are normally recognized only after the following character has begun, and these special case characters are recognized by "special case recognition". As described in the following, the special case recognition characters are recognized in a way that approximates main-sequence recognition when they are not followed by any other character, i.e., when they are the last character of the string.

A period (or decimal point) is recognized as a very brief pen-down that occurs at the beginning of a character recognition sequence. Because it is based on timing and is independent of the logical tree, it does not appear on any of the four tree figures which have been shown.

Although in the description of the writing of a character for recognition by the present system it has been arbitrarily required that no character may begin with the sequence (R,.), it is, of course, still possible to write that sequence. It has been established herein that that sequence is recognized as a "space " character, with the understanding that unless care is taken, there is the possibility that it may under some circumstances be confused with the "cross bar" stroke (e.g., the stroke distinguishing an E from an F). The care required is simply to wait for the special character (in this example, an F) to be recognized by the psuedo-main-sequence logic (which involves timing), and then to write the (R,.). Thus, the sequence (L,D,.,R,.,R,.) would be recognized as the letter E if there was only a brief delay after the second ".", but would be recognized as F, if a suitably long delay occurred after the second ".".

NODES AND BRANCHES

Consideration will now be given to how the logical branching represented by the various trees is accomplished. A read-only memory (ROM) may be employed, by way of example, which is eight bits wide and 1024 bits long. It therefore requires a 10-bit address to specify a unique memory location. This 10-bit address is supplied in two parts; the seven most significant bits (MSB), which are collectively called the "node address", and the three least significant bits (LSB) which are collectively called the "branch address". By this arrangement, the MSBs can specify any of 128 ($=2^7$) nodes in the memory and the LSBs can specify any one of eight ($=2^3$) branches of that node. A node specified by the node address is called an active node.

Reference and the discussion that follows to "advancing through the tree" or the like should be taken to mean that the node address advances through some particular sequence that depends on the sequence of pen directions supplied. As described subsequeently herein, a branch address depends on the instantaneous direction of writing (up, right, down, left), the pen-up status, and on other timing and internal logic conditions.

Table I shown below shows the relationship between instantaneous pen direction, branch, and the contents of the node cells. By node cells is meant the memory location assigned to contain a node address. The typical sequence of operations is as follows: having reached a particular (active) node, specified by seven MSBs, the very next pen direction provides LSBs which, together with the seven MSBs, will select a particular branch location in memory, the contents of which are then used as a new node address. Thus, as shown in Table I, if the very next pen direction is U, the branch cell in memory is designated as cell No. 1 and it will contain the node address for up, which is the new node address. Typically, a node that is reached by a particular branch (i.e., some particular direction) contains its own node address at that same branch number (corresponding to the same direction) in its own branch list. In this way, the active node only changes when the pen direction changes and any other motion than a pen direction change may be disregarded.

Table I

| Pen-Direction | Branch | Contents of Node Branch Cell in Memory |
|---|---|---|
| | 0 | Node Address for Pen-up/code + flag for recognized character |
| U | 1 | Node Address for Up |
| R | 2 | Node Address for Right |
| D | 3 | Node Address for Down |
| L | 4 | Node Address for Left |
| * | 5 | Node Address for Abort code + flag for special character |
| * | 6 | Code + flag for special character |
| * | 7 | Node Address for start after special character |

Figure 14:
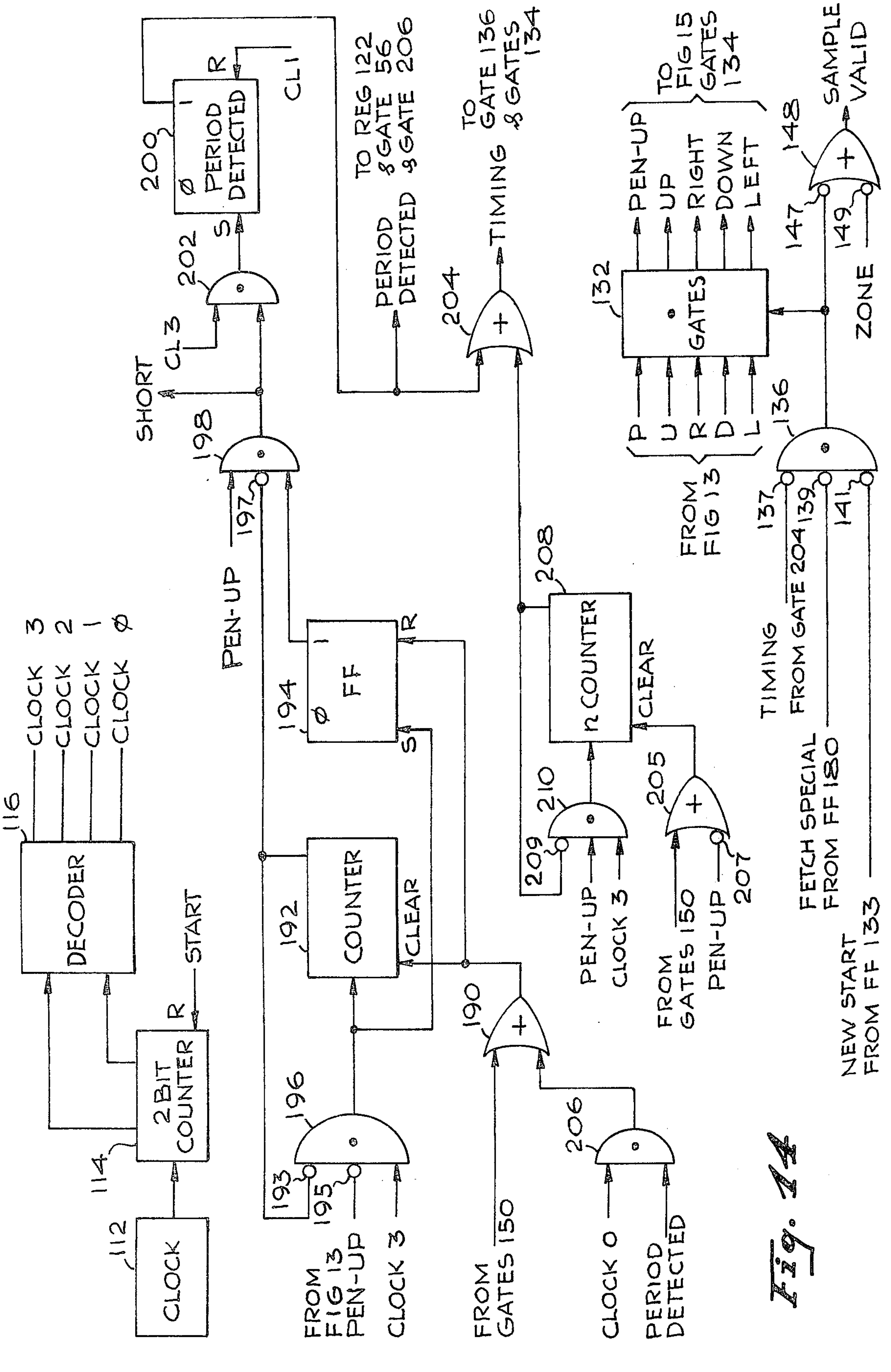
FIGS. 14 and 15 are block diagrams of the logic circuits used to identify, by a unique code, each handwritten character in response to a sequence of signals representing directions which are followed in writing a character.
Figure 15:
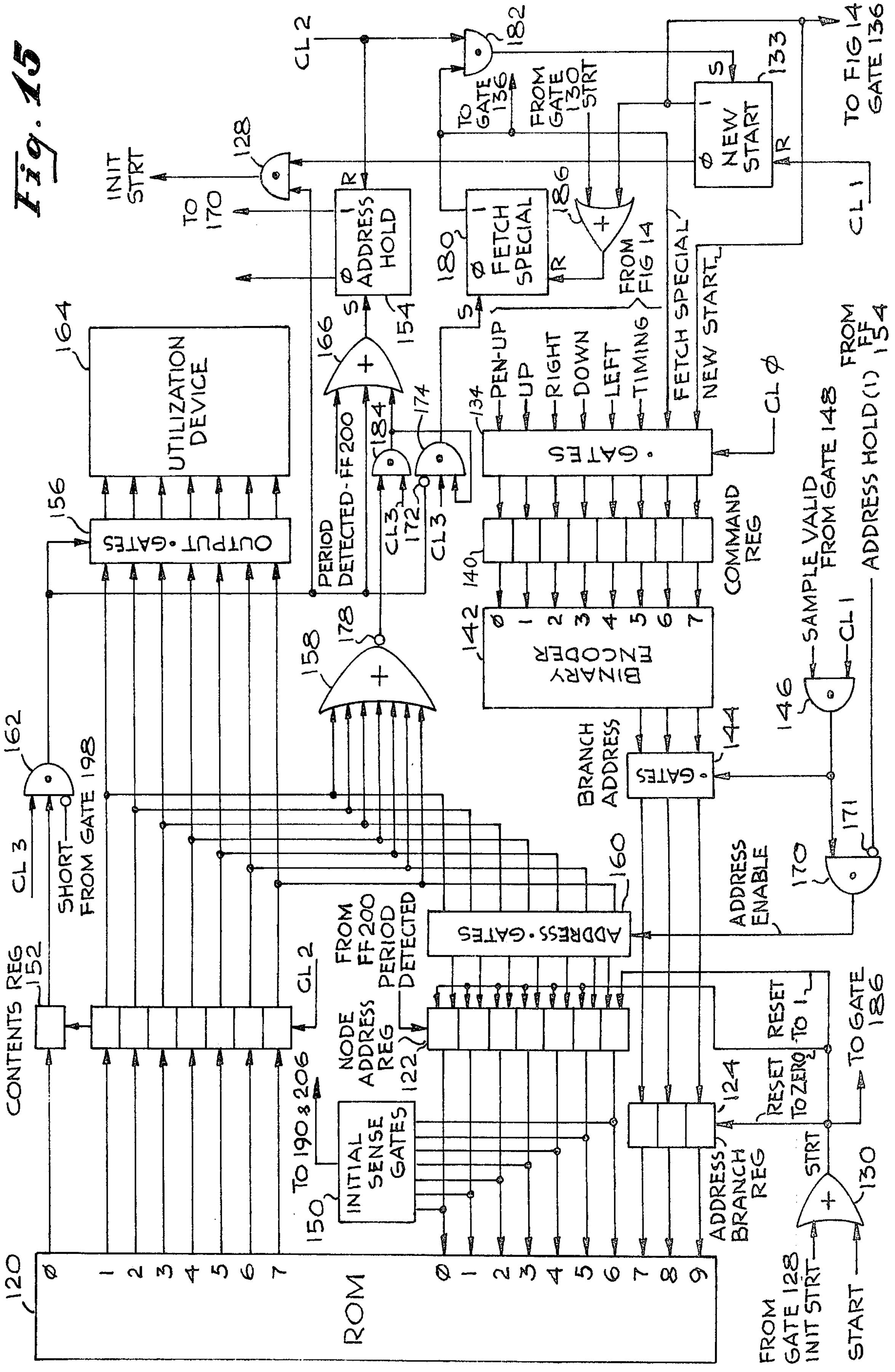

*Branches 5, 6 and 7 are selected by the processing circuits shown in FIGS. 14 and 15 and do not depend on the pen direction.

Only seven bits of an eight bit output derived from each storage location in the ROM are needed to specify a node address. The eighth bit (bit 0 of the MSB) is used as a flag to indicate that the other seven bits are to be used as a new node address, i.e., (bit 0 = 0), or that a character has been recognized (bit 0 = 1), and the other seven bits contain the character code.

Special case characters such as F, T, 1, and 2, are not normally recognized immediately after a pen lift, but only after the next character has been started, as described earlier. If the next stroke sequence is not (R,.), a special character is immediately recognized as such and recognition of the new character continues, taking into account the strokes already made. If the next stroke sequence is (R,.), it indicates that the character was not a special character (e.g., F, T, or 2), but one distinguishable therefrom by an additional stroke such as E, I, or Z.

The general node logic for recognizing special cases is shown in FIG. 11. Effectively, FIG. 12 modifies or replaces those branches of a tree shown in each of FIGS. 7, 8, 9, and 10 where one branch has an asterisk placed adjacent one of the outputs. Thus, in FIG. 7, the general aligned node logic tree circuit shown in FIG. 11 could be substituted in place of the part of the tree following D and thus would effectively replace the (1,A) branch. In FIG. 8, the general node logic could replace the (7,1,) branches. In FIG. 9, the general node logic shown in FIG. 11 could replace the (T,I), branches and in FIG. 10 the special case node logic shown in FIG. 11 could replace the (O,Q), branches.

The way this works is, at pen lift, which occurs at the completion of a special character, (e.g., F), one is brought to a node labeled "SDOT" at which node a way occurs for a new direction. If in writing a new character, that new direction is U, D, or L, [$\overline{(R,.)}$], the special character is immediately recognized and the program restarts. The new direction (i.e., U, D, or L), always persists long enough that the new stroke will be recorded as the initial direction of the new character.

If the new direction is (R), the logic proceeds to another node labeled SR where a wait occurs for a next output signal from the pen. If pen up (.) is the next "direction" obtained the character is recognized as a non-special character, such as E, since (R,.), has occurred, and the process starts again from its initial state. However, if instead of a pen up, the next output from the pen is U, D or L, a special character is recognized (e.g., F), and the recognition process is restarted but this time from the node that would normally have been reached by an initial R which is the node shown in FIG. 8.

Table II

| Bit 0 | Bits 1–7 | Bit O | Bits 1–7 |
|---|---|---|---|
| 0 | SDOT | 1 | Code for non-special character |
| 0 | 0 | 0 | 0 |
| 0 | SR | 0 | SR |
| 0 | 0 | 0 | 0 |
| 0 | 0 | 0 | 0 |
| 1 | Code for special char. | | arbitrary |
| 1 | Code for special char. | 1 | Code for special character |
| 0 | Initial node address | 0 | "Initial right" node address |

Table II shows the generic forms of the respective nodes SDOT and SR which are shown in FIG. 11. These are the special case nodes. The final pen up of a special character brings one to the node SDOT. If the next direction is U, D or L, the branch address specified as 1, 3 or 4 (see Table I), respectively, will cause the number 0 to be obtained as the new node address. This special node address is recognized as an abnormal address (subsequently described herein) and the processor goes into a sequence of steps that results in (1) fetching the contents of branch cell 6 (as shown in Table I, the code for a special character and the flag bit), (2) outputting of the special character and (3) restarting at the address contained in cell 7 (which is the initial address in this case).

If, on the other hand, the first direction obtained after the SDOT node is reached is R, then the SR node becomes active. This node continues addressing itself as long as the pen direction is to the right. If the next direction however is "dot", the non-special character is recognized, as any main sequence character would be. Any other change of direction however results again in a fetch of an all zero word which, as in the case of the "SDOT" node, causes a special character code and branch cell 6 (See Table I) to be outputted, and the new starting address (in this case "initial right") to be used in the recognition of the new character.

Finally, if the pen is lifted for more than a certain length of time, at a node where a character is not yet recognized, the processor will specify branch 5 as the branch address. If the node is an SDOT type node, cell 5 contains the code and output flag of the special character; in this way a special character is recognized even when it is not followed by another stroke. For all other nodes, cell 5 contains the initial address; this allows an automatic abort and restarts after a misrecognized character or an unintentional stroke.

DETAILED CIRCUIT DESCRIPTION

FIG. 12 is a cross section of a pen of the general type which may be used for the purpose of generating direction signals. This pen is shown and described in detail in a previously indicated application by these inventors, Ser. No. 405,296, filed Oct. 11, 1973. What is shown is an enlarged cross-sectional view of the writing portion of the pen suitable for generating signals of the type required for this invention. The pen comprises a ballpoint ink cartridge 10 which extends from a housing 12, to afford writing. At a suitable distance from the ballpoint end of the cartridge and within the housing, there is a ball and socket joint 14 whereby the ballpoint cartridge 10 may be held so that it is free to swivel, to a limited extent, in a direction determined by the motion of the pen when used for writing. The swivel joint 14 is supported centrally on a shelf 16, which is attached to one end of a spring 18, with which the shelf carrying the swivel is free to move in a direction to compress the spring when the pen is pushed against the paper for the act of writing. The other end of the spring is attached to a stationary shelf 20, and when the pen is pressed down for the act of writing, the stationary shelf 20 serves to stop the upward movement of the moveable shelf 16.

The moveable shelf 16 carries a contact 22, and the stationary shelf 20 supports a contact 24, at a location to oppose the contact 22 when it is moved upward. When the moveable shelf 16 is moved upward far enough, it is arrested in its motion by the stationary shelf, at which time contacts 22 and 24 can make connection. Contact 22 is connected to one side of a power supply 26. Contact 24 is connected to one side of a potentiometer 30, whose other side is connected to the other side of the power supply 26. A photodiode 38 is connected across the power supply 26. Accordingly, when the pen is pressed down for writing, contacts 22 and 24 close and enable a current flow through a potentiometer 30 whereby a pen down signal is generated.

In the upper end of the barrel of the pen there are quadrantially positioned four photodiodes respectively 32, 34, 36, and 38. The leads from these respective photodiodes are designated by the letters A, B, C, and D and respectively provide quadrantial signals A, B, C, and D. While the photodiodes are represented separately, a single "quadrant" type photocell may be used. This is a photocell which has its sensitive surface divided into four quadrants from which four separate signals may be derived. This is schematically shown in FIG. 13.

PEN PREPROCESSOR CIRCUITS

Figure 13:
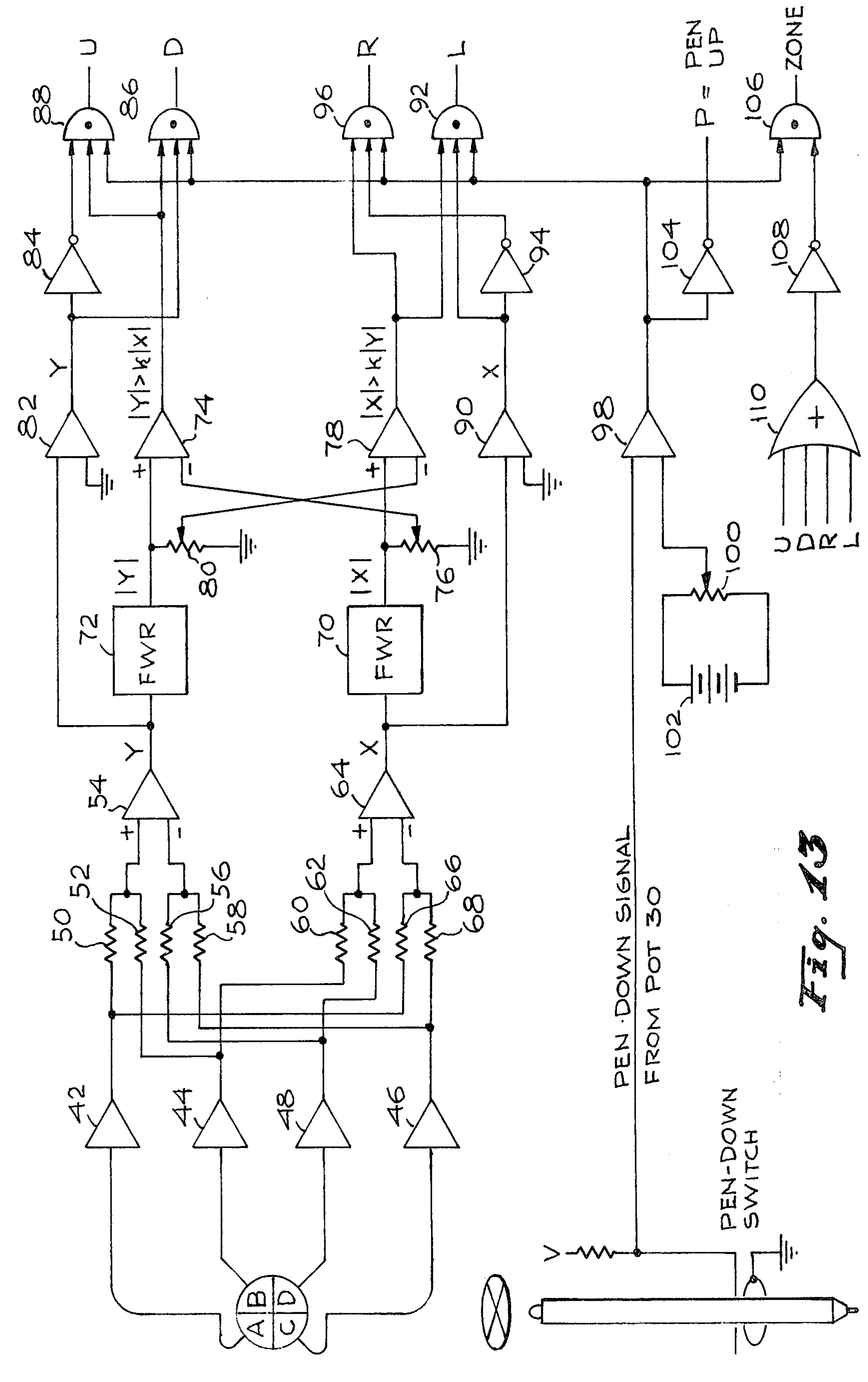
FIG. 13 is a schematic diagram of the circuit following the pen for generating direction signals as the pen is moved in writing a character.

FIG. 13 is a schematic diagram of the circuitry to which the pen signals are applied for generating, in response thereto, signals designated as up, down, right, left, pen-up, and zone. These are the signals, previously discussed (except for zone whose use will be described subsequently herein) which enable character recognition. If the pen is not touching the paper, then the pen-up signal is high, and all other signals are low. If the pen is not up, but pressing down with a force greater than some adjustable level, one of the other five signals is high and the remaining four are low. Thus, at any one time only one output from the circuit shown in FIG. 13, which may be called the pen preprocessor circuit is high. The four direction signals indicate the instantaneous direction of motion of the pen, quantized into the four sectors detected by the four photocells. The decision as to which signal is active is made in the pen preprocessor circuit on the basis of comparisons of the signs and magnitudes of X and Y signals.

If the direction of writing is denoted by the angle $\theta$, then the two signals X and Y are respectively COS$\theta$ and SIN$\theta$.

If the X and Y signals are very close to each other in magnitude, this indicates that the pen is moving along a path that is close to the line dividing two sectors. In such a case it is possible for the pen to generate signals that might be confusing to the character recognition processor. For example, drawing a line to the right and along the nominal 45° line that separates the U and R zones might produce the sporious direction sequence (U,R,R,U,U,R,R,U,R,R,). To avoid problems of this sort, it is desirable to incorporate some angular hysteresis along such lines. Thus, if the magnitudes of the X and Y signals are suitably close to one another, as determined by an adjustable setting in the preprocessor circuits, none of the signals (up, right, down, left) is high but instead a zone signal is high. When this zone signal is high the character recognition circuitry treats the sample as though it were the same as the previous one, which provides the necessary hysteresis.

The four quadrant cell outputs as represented by the quadrantially divided circle, 40, in FIG. 13, which has the A, B, C, and D designations for the quadrants, corresponding to the outputs from the photodiodes shown in FIG. 12, are each amplified by amplifiers respectively 42, 44, 46, and 48. The signals from the A and B quadrants are then added by summing resistors 50, 52 which constitute one input of a differential amplifier 54. The outputs of the C and D quadrants are added by summing resistors 56, 58 which constitutes the second input to the differential amplifier 54. The output of differential amplifier 54 constitutes the signal Y, indicative of the fact that the pen is being moved in the vertical direction, whose polarity however signifies whether the direction is up or down.

Signals from the B and D quadrants are summed by resistors 60, 62, whose sum output is applied as one input to a differential amplifier 64. Signals from the A and C quadrants are summed by resistors 66 and 68 and are applied as the opposing inputs to the differential amplifier 64. The output of the differential amplifier constitutes the signal X representative of motion to the right or to the left as determined by the polarity of the signal.

The X and Y signals are respectively applied to fullwave rectifiers 70, 72 to provide as output an absolute magnitude signal, $|X|$, and an absolute magnitude signal $|Y|$. To develop the angular "zones" along the 45° diagonals, $|X|$ is compared with a fraction, $k$, of $|Y|$ and $|Y|$ is compared with a fraction, $k$, of $|X|$. If $|Y|$ is greater than $k|X|$, it is known that the pen is moving U or D and is not in the zone area. If $|X|$ is greater than $k|Y|$, it is known that the pen is moving horizontally and is not the zone area. If the latter two indicated situations are not the case, then the magnitudes of the X and Y signals are suitably close to one another and the zone signal would be high.

To determine which of the signals should be high, (U,D,R,L, or zone), the output of the fullwave rectifier 72 is connected as one input to a comparator 74. The other input to the comparator is derived from a tap on a potentiometer 76, which is connected across the output of the X fullwave rectifier 70. Thus, the output of the comparator 74 would indicate whether or not $|Y|$ is greater than $k|X|$. Similarly, a comparator 78, has one input comprising the output of the fullwave rectifier 70, which is $|X|$. The other input derived from a tap on the potentiometer 80, is connected across the output of the $|Y|$ fullwave rectifier 72. The output of the comparator 78 indicates whether or not $|X|$ is greater than $k|Y|$.

The output of the differential amplifier 54, comprising Y is applied to a comparator 82, whose other input is connected to ground. Thus, the output of the comparator 82 is the term Y, which is then applied to an inverter 84 and as one input to a three input AND gate 86. A second input to this AND gate is the output of the comparator 74 and the third input is a pen-down signal. The output of the AND gate 86 is a signal D. The U signal is derived from the output of an AND gate 88. One input thereto is the output of the inverter 84. A second input is the output of the comparator 74, and a third input is the pen-down signal.

The output of the differential amplifier 64, constituting the X signal, is applied to a comparator 90, whose other input is grounded. Thus, the comparator 90 output is the inverted X signal. This is applied as one input to an AND gate 92 as well as to an inverter 94. The output of the comparator 78 constitutes the second input to the AND gate 92. The third input is the pen-down signal. The output of the AND gate 92 constitutes the signal L.

An AND gate 96 receives as a first input the output of the comparator 78. The second input is the output of the inverter 94. The third input is the pen-down signal. The output of AND gate 96 constitutes the signal R.

The pen-down signal from the potentiometer 30 in FIG. 12, is applied to a comparator (or differential amplifier) 98. The other input to the comparator 98 is a voltage signal representative of the pressure threshold. This is derived from a tap on a potentiometer 100, which is connected across a potential source 102. The pen-down signal, as previously indicated, constitutes one enabling input to AND gates 86, 88, 92, and 96. It is also applied to an inverter 104, whose output is the inverted pen-down signal or a "pen-up" signal. That is, when the pen-down signal is not present, the output of the inverter is high and therefore constitutes the pen-up signal.

The zone signal, as previously indicated, occurs when the magnitudes of the X and Y signals are close to one another so that, neither $|X| > k|Y|$ nor $|Y| > k|X|$, as a result of which none of the signals U, D, R, or L are high. The zone signal is provided by the output of an AND gate 106. One input to this AND gate is the pen-down signal. The other required input to this AND gate is the output of an inverter 108. An OR gate 110 has U, D, R, and L inputs. In the presence of a U, D, R, or L signal, the output of OR gate 110 drives the inverter 108, and the output of the inverter is low and thus the zone signal is not present. However, when, for the reasons indicated, there is no U, D, R, or L signal, the output of the inverter is high and in the presence of a pen-down signal a zone signal is provided.

PEN SIGNAL RECOGNITION CIRCUITS

FIGS. 14 and 15 constitute a block schematic drawing of a character recognition system in accordance with this invention. A clock circuit 112 drives a two bit counter 114. The output of the two bit counter is connected to a four phase decoder 116, whose output constitutes four phase clock signals denoted by their sequence of occurrences clock 0, clock 1, clock 2, and clock 3. The system is driven in response to these four phase clock signals. The pen direction is sampled at each clock zero pulse. This may be on the order of 50 to 100 samples per second depending on the clock frequency selected.

In FIG. 15, a read only memory, hereafter designated as a ROM, 120, is addressed by an address register, seven bits of which are hereby designated as the node register 122 and the other three bits of which are designated as the branch register 124. The output from the ROM is transferred to an eight bit register called a contents register 152. An initial start OR gate 128, when actuated in response to either a start signal, provided by closing a switch, (not shown), when the system starts up, or by an "INIT STRT" signal from a gate 170, applies its output to an OR gate 130, whose output resets the node address register 122 and branch address register 124 to their initial states, namely binary (0000001) and (000), respectively — i.e., node 1, branch 0.

In FIG. 14, a set of gates 132, are connected to receive the respective P (pen up), U, R, D, and L outputs from the AND gates shown in FIG. 13. Gates 132 are enabled to enter their contents into gates 134 (FIG. 15), in response to the output of a gate 136 (FIG 14). The input to gate 136 is a "Timing" or "Fetch Special" or "New Start" signal, all of which are applied through inverters 137, 139 and 141. Thus, gate 136 output is high, and enables gates 132, so long as all of its inputs are absent.

Upon the occurrence of a clock 0 signal, gates 134 in FIG. 15, are enabled to allow their contents to be applied to a command register 140. The output of comand register 140 is applied to a binary encoder 142, which converts any one of its eight binary inputs to a three bit binary signal. This three bit binary signal constitutes the branch address and is entered into three gates 144.

An AND gate 146, enables gates 144 to transfer their contents into the address branch register 124 upon the application of a clock 1 pulse to its input together with a "sample valid" signal. The sample valid signal is derived from the output of an OR gate 148, (FIG. 14). The input to OR gate 148 is the output of AND gate 136 applied through an inverter 147 and a zone signal applied through an inverter 149. In the absence of a zone signal or in the presence of a low output from AND gate 136, OR gate 148 provides a "sample valid" signal output to AND gate 146.

The address registers for the memory, respectively node address register 122 and branch address register 124 together now contain a complete address whereby the memory 120 can be addressed. Initial sense gates 150 detects when the node address register has the initial address (0000001) and provides a true output only in response thereto. The utility of this true output will be discussed subsequently herein.

The read only memory 120, in response to the ten bit address input, provides an eight bit output representing the number contained at the location addressed. This output number is clocked into a "contents register", 152, upon the occurrence of the clock two signal. This clock two signal also resets an "address hold" flip flop 154. The seven least significant bits of the number in the contents register are applied to output gates 156, to an OR gate 158, and to address gates 160. If the most significant bit (161) of the contents register is true, this indicates that a character has been recognized and that the other seven bits are the ASCII code (or any other code) for the recognized character. In that event, bit 0 of the contents register 152, in the presence of a clock three signal and in the absence of a "short" signal enables a gate 162. Gate 162 output enables output gates 156 whereby they can transfer their contents to a utilization device 164. The utilization device can be a computer input, a transmission system, or simply a display device.

The output from the AND gate 162 is also applied to gate 128 whose other input is the 0 or reset output of a new start flip flop 133. This flip flop is reset by each clock one pulse. It remains in its reset state when a character is recognized by a main sequence recognition and thus supplies an enabling input to gate 128 in this condition. The initial start output of gate 128 is supplied to OR gate 130, which then proceeds to clear the branch address register 124 and to reset the node address register 122 to its initial condition to enable it to begin a new character recognition sequence.

The output of the AND gate 162 is also applied to an OR gate 166 whose output sets the flip flop 154 (which is unconditionally reset at each clock two pulse). The reason for setting flip flop 154 is to disable address gates 160 upon the occurrence of the next clock one pulse. This occurs by reason of the fact that the one or set output of flip flop 154 is applied through an inverter 171 to an AND gate 170. The other input to this AND gate is a clock one pulse received through enabled AND gate 146. In this manner the initial address which was just entered into the node address register 122 is maintained, rather than replaced by the ASCII number entered into address gates 160 from the contents register 152 pursuant to the last read out from memory.

If bit zero of the contents register 152 is a zero, then gate 162 will not provide an output. An inverter 172 inverts the low output of gate 162 and applies it to an AND gate 174. The other input to this AND gate 174 is the output of AND gate 184. The third input is a clock 3 pulse. Gate 174 is not enabled unless all of the inputs to AND gate 158 are low, that is, the seven least significant bits of the contents register 152 are an all zero word. In this instance, the output of AND gate 174, upon the occurrence of the clock three pulse will set a flip flip 180 designated as the "fetch special" flip flop. The one output of the fetch special flip flop 180 is applied as the No. 6 input to the gates 134 and also to an AND gate 182, which, upon the occurrence of the next clock two pulse, sets the "new start" flip flop 133.

An AND gate 184, connected to the output of OR gate 158, also provides an output upon the detection of an all zero word by OR gate 158 and the occurrence of a clock three pulse. This output is applied to the OR gate 166 whose output sets the address hold flip flop 154, whereby address gates 160 are not enabled to enter the seven zero bits presently in the contents register into the node register but rather permits the current node address to be retained in the node register for one more cycle.

On the other hand, if any one of the seven least significant bits of the contents register 152 is true, (i.e., a normal address), gates 184 and 174 are disabled and the new node address is transferred into the node address register through address gates 160 upon the occurrence of the next clock two pulse.

Those then are the respective main functions of the clock zero, clock one, clock two, and clock three pulses. These are respectively sample and decide the next pen "direction"; gate a new ten bit address to the ROM; read out the contents of the ROM at that new address; and gate the least seven significant bits of the address to (1) the output register, if it represents the code of a recognized character, (2) the address register if it is the address of a new node of the tree, or (3) takes special actions (described below) if the seven bit address is zero.

It will be seen that the seven bit node address register 122 can supply bits sufficient to address 128 different addresses in the ROM. The three LSB's of the address, which are supplied by the branch address register 124, can specify one of eight addresses begining at the node address contained in the node address register and continuing in consecutive locations in memory to the address "node plus seven" Thus, the branch address register 124 indicates which of the eight branches is to be used with a specified node. Branches 0, 1, 2, 3, and 4 are used in both main sequence and special case recognition. Branches 5, 6, and 7, as shown in Table 1, are not associated with main sequence character recognition but are applied to special case character recognition and to the character "period" (or decimal point).

SPECIAL CASE CHARACTER RECOGNITION

The distinguishing difference between main sequence and special case characters is that main sequence characters are recognized immediately following a pen-up signal, whereas special case characters are not normally recognized until the following character has already been begun. (F, 1, 2, etc.). The significance of this, in the special case characters, is that not only must the appropriate ASCII code be applied to the utilization device, and the recognition sequence be restarted, but account must also be taken of the strokes already made, and attributable to the new character. To accomplish this end, each bit of a ROM cell, at any address where a special case character is recognized (i.e., corresponding to branches 1, 3, and 4 at either the SDOT or SR node, (FIG. 12), is set to zero. When such an all-zero address is received from the ROM at clock 1 time, the following clock two signal will get all zeros into the contents register 152.

If all bits of the contents register 152 are zero, the output of OR gate 158 enables AND gates 184 and 174 with the results that flip flops 154 and 180 are set. When flip flop 154 is set, it disables the address gates 160 in the manner previously described, at the next clock one pulse. The purpose in this case is to maintain the same active seven bit node address as existed previously and not enter all zeroes. At the same time, upon the occurrence of the clock one pulse, gate 146 enables the new branch address to be transferred into the branch address register 124. The branch address designation, in this situation, is controlled by the one output of the fetch special flip flop 180, which is connected to cell number 6 of gates 134. Upon the occurrence of the clock zero pulse a one is entered into the sixth cell of the command register 140. The one output of fetch special flip flop 180 is also applied to gate 136 (FIG. 14) through the inverter 139. The output of gate 136 goes low at this time whereby the gates 132 are prevented from transferring their output to gates 134. The output of gate 136 is also applied to the AND gate 148 through the inverter 147, which insures that the fetch special signal is treated as a valid sample, even if the zone signal is true. It should be recalled that the zone signal is true when the direction that the pen is moving lies in certain zones (along the 45° lines separating the U, R, D, and L sectors) where it is wished to ignore these samples.

In response to a one being placed in the sixth cell of the command register, the binary encoder 142 produces a binary number 110 at its output, which is clocked into the brance address register 124 upon the occurrence of the next clock one pulse. The new ten bit branch address, consisting of the previous seven bit node address and 110 now contained in the node address and branch address registers will cause a read out from the memory of an eight bit number in which bit zero, which is inputted to the contents register is a one and the seven LSB's are the ASII code of the recognized special case character. This is inputted into the contents register 152 at clock two time. At the same time, the output of gate 182 goes high, resulting in the setting of the new start flip flop 133. The one output of the new start flip flop is applied to an OR gate 186, whose output resets the fetch special flip flop 180.

At clock three time, the character code in the contents register is enabled to be transferred through the output gates 156 to the utilization device 164 and address hold flip flop 154 is set again, as was previously described, by receiving the output of AND gate 162 through OR gate 166.

Since new start flip flop 133 is now set, at the time of the occurence of the output from gate 162, (clock three pulse time), gate 128 is not enabled and thereby, the restarting procedure generated by the "Init start" output of gate 128 is inhibited. Instead, the one output of new start flip flop 133 is inputted through gates 134, on the next clock zero time, into the cell number seven of the command register 140. Also, the one output of new start flip flop 133 is applied to the input to AND gate 136 (FIG. 14) whereby the gates 132 are inhibited from transferring their contents into gates 134.

The binary encoder 142 encodes the output of the command register this time as "111" which is applied through gates 144 at the next clock one time to the address branch register 124. It should also be noted that because address hold flip flop 154 was set by the previous clock three input through gate 166, no enabling input signal is applied to gate 170 thereby inhibiting gates 160. As a result, the address contained in the node address register 122 remains unchanged (i.e., the same node address is maintained), but the index register address is set to point to the new start branch of the node.

This cell contains the address of the initial node of the tree in the case of a SDOT node, or the address of the initial right branch in the case of a SR node (See Table Two). In either case, recognition of the new character will continue, taking into account the directions already recognized. The clock one signal also clears the flip flop 133 effectively restoring the main sequence mode of operation. Thus, the processor circuitry realizes the special character logic outlined schematically in FIG. 11 and shown in corresponding node logic form in Table Two.

DETECTION OF A PERIOD OR DECIMAL POINT

When the node address register contains the address of the initial node, initial sense gates 150 detect this condition and produce an output which is applied to a gate 190 (FIG. 14). The output of gate 190 clears a counter 192, in preparation for testing for a period. The output of OR gate 190 also resets a flip flop 194 which indicates that a character has not yet begun. Note that the output of gates 150 occurs only immediately following a character recognition by the main sequence or at an SDOT node. In the main sequence case, a pen-up signal is generated as a writer lifts his pen up after writing a character. As soon as the pen-up signal goes false, (when a writer applies pen to paper again), as it already would be if the previous recognition occurred via an SDOT node, clock three signals can be gated through an AND gate 196 to step counter 192 through a counting sequence and to set flip flop 194, enabling a set input from flip flop 194 to AND gate 198. The last count output of counter 192 is connected through an inverter 193 to the input of AND gate 196, and also through an inverter 197, to an input to gate 198. The pen-up signal is applied through an inverter 195 as an input to AND gate 196.

If more than M counts occur while the pen is down, (as would occur when writing any character but a period, the counter output goes high, removing the enabling signals at the inverting inputs to gates 196 and 198. The disabling of gate 196 leaves the counter latched at its maximum count with its output true. When the pen is lifted, the pen-up signal becomes true at gate 198, but because the count M was exceeded, the output of gate 198 remains low and a "period detected" signal, which would be generated by the set output of a flip flop 200, is not provided.

Counter 192 remains latched until after a character is recognized by the main sequence, giving rise again to an output signal from the initial sense gates 150, whereby the counter 192 is cleared through gate 190 and the flip flop 194 is reset.

On the other hand, if the pen is down for only a very brief time, counter 192 will not reach its maximum count and its output will remain low. This happens when the pen is briefly touched down to write a period. When the pen is lifted in such a case, the pen-up signal present at AND gate 198 drives the output of the gate high providing a signal designated as short. This short signal is applied to an AND gate 202. Upon the occurrence of a clock three pulse, the output of AND gate 202 sets flip flop 200 whereby its output provides a period detected signal.

The period detected signal, which occurs at clock three time, serves three functions. First, it is applied to OR gate 166, (FIG. 15), whose output then sets the address hold flip flop 154 whereby address gates 160 retain the address that they presently have for the next cycle and do not enter a new address. Second, the period detected signal set the node address register 122 to all zeros. Finally, it enables an OR gate 204 to provide an output signal designated as timing.

The timing signal is applied through an inverter to gate 136 whereby the enabling input to gate 132 is removed. The timing signal is also applied through the fifth cell of gates 134 to be entered as a one into the fifth cell of the command register 140 upon the occurrence of the next clock zero time.

In response to a one in the fifth cell of the command register, the binary encoder 142 enters "101" into the branch address register, through the branch address gates 144, upon the occurrence of the next clock one signal. An AND gate 206, (FIG. 14), has as one input the period detected signal and as a second input a clock zero signal. In the presence of the peroid detected signal, upon the occurrence of the clock zero signal, And gate 206 applies an output to OR gate 190 whose output thereupon clears the counter 192 and resets the flip flop 194. Since the address hold flip flop is in its set state, the address gates 160 are still disenabled and the node address register will be maintained in its cleared or zero state.

At clock two time, the contents register 152 is loaded with the contents of the ROM cell which is now addressed. Since the address 101 in the branch register is the binary address for location five of node zero, contents of this location are the ones transferred into the contents register 152. This location is one in which bits one through seven contain the ASCII code for a period and the zero bit in the command register will contain a one. At clock three time, a normal output sequence will be generated and an initial start signal will be outputted to begin a new character.

SPECIAL CASE CHARACTER WHEN NOT FOLLOWED BY ANOTHER CHARACTER

It will be recalled that the recognition decision about a special character is normally deferred until the following character is begun. If the new character begins with a sequence (R, .) the stroke is regarded as the "crossbar" of the preceding character, and the character is treated by main sequence recognition. On the other hand, if the first stroke of the next character is not (R, .), the preceding character is recognized as a special case sequence and the new stroke sequences are regarded as belonging to a new character. However, there are occasions when a special case character may be the terminating character of a string. In such a case, the character is recognized with the aid of the following timing circuitry.

When a new recognition sequence is begun, the address register 122 contains the address of the initial node, and the initial sense gates 150 detect this address and produce a high signal output. This signal is applied to an OR gate 205, (FIG. 14). The output of the OR gate 205 clears an N-counter 208. The other input to gate 205 is the pen-up signal applied through an inverter 207, or, in other words, so long as the pen is applied to the paper for the purpose of writing, the output of OR gate 206 will maintain counter 208 in its cleared state. As writing continues, the output signal from initial sense gates 150 is no longer provided to the OR gate 205. Thus, when the pen is lifted from the paper at the conclusion of the writing, the OR gate 205 no longer provides a signal to maintain counter 208 cleared. The last count state output of the counter 208 is applied through an inverter 209 to an AND gate 210. Other required inputs to this AND gate are the pen-up signal and the clock three pulse signals. Thus, upon the occurrence of the pen-up signal, clock three pulses are applied through the AND gate 210 to cause counter 208 to commence counting.

Three possible events may happen upon the lifting of the pen or upon the occurrence of the pen-up signal. (1) a character may be recognized by main sequence recognition; (2) a character may not be recognized but the pen may be placed down again shortly to generate more direction sequences; (3) a character may not be recognized and the pen may remain up.

In the first instance, gate 128 provides an output at clock three time following the pen-up signal, the node address register 122 is loaded with the initial node address, and initial sense gates 150 provide an output which clears counter 208 through OR gate 205 as before. In the second case, the pen-up signal soon again goes low, clearing counter 208 through gate 205. In the third case, clock three pulses are counted up by the counter 208 until the counter reaches its N state at which time the AND gate 210 is disabled and an output is applied to OR gate 204, which in response provides an output previously indicated as a "timing output".

The output from gate 204 disables the output from gate 136 whereby the gates 132 outputs are disabled. The timing signal is again applied to the fifth cell of gates 134 and is entered therethrough upon the occurence of the clock zero signal into the number five cell of the command register. Encoder 142 again produces the binary number 101 at its output and this number is clocked into the index register 124 by gates 144 at the next clock one time.

At that time, the node address register is still loaded with the same node address that was reached at the time of the pen-up signal, that enabled the counting of counter 208. Now, at clock two time, the contents register 152 is loaded with the contents of the timing cell (branch five) of this particular node. The timing cell contains the ASCII code of this particular special case character in bits one through seven and bit zero is again set to one. Thereafter, the normal output sequence occurs. In this case, however, a special case character is recognized even though no new character is written after the special case character.

In the ROM at all locations addressed by a node plus a 5 branch address, for all nodes which do not involve a special case character, there is stored the address of the initial node (which reinitializes the recognition sequence). Thus, if a writer starts to print a character and realizes he has made a mistake, he can simply lift the pen and (provided he has not written a recognizable sequence), after a short time a timing signal is generated and the recognition logic will reinitialize itself (automatic abort) and he can begin anew. In particular, if a legitimately written character is ot recognized correctly for some reason, the writer can try again after a short interval.

From the foregoing description, it should be apparent how, by writing with a pen which provides output signals indicative of the direction being written, as well as pen-up and pen-down signals, a sequential search through data storage apparatus is conducted which produces a final output constituting signals representative of the character which has been written. The sequencing proceeds in response to an address comprising two parts. One part, aside from an initial address, provided at the beginning of any writing, is read out of memory from a previously addressed location. The second part of the address is provided by the direction signal output from the pen. Direction signals not required for proper sequencing through the data storage device to obtain the character representative digital signals are disregarded.

The embodiments of the invention in which an exclusive property or privilege is claimed are defined as follows:

1. A system for generating a set of digital signals representative of a handwritten character comprising pen means for generating for each character which is written a sequence of direction signals representative of the sequence of directions taken in writing a character, and means responsive to predetermined direction signals including means for storing, for each character, at successive locations, part of the data required for locating the next of said successive locations, with a final one of said locations storing a set of digital signals representative of a handwritten character, means for combining each direction signal with data signals derived from said means for storing, and means for successively addressing said means for storing with both a sequence of direction signals and a sequence of data read from said means for storing until a final one of said locations is located following the last direction signal generated by said pen means in writing a character.

2. The method of generating a set of digital signals representative of a handwritten character comprising:

generating a sequence of direction signals. each direction signal being representative of the direction taken by a pen in writing a character, storing, at successive locations in a memory, for each character, part of the address required for addressing the next of said successive locations, with a final one of said locations storing a set of digital signals representative of a handwritten character, converting each direction signal in a sequence into "remainder of an address" signals which together with "part of an address" signals form a complete address required for addressing a location in memory, generating signals representing part of the address of a start-up address for addressing said memory, combining said part of the address of "start-up address" signals with the "remainder of an address" signals derived from a first of the direction signals in a sequence to provide a first complete address, addressing said memory with said first complete address to read out therefrom "part of an address" signals of a next location in memory, combining each "part of an address" signals read from memory with each of a sequence of "remainder of address" signals derived from a seequence of direction signals to provide a sequence of complete address signals, addressing said memory with said sequence of complete address signals until the set of digital signals stored at a final one of said locations has been read out of said memory, and generating signals representing part of the address of a start-up address responsive to the set of digital signals read out from said final one of said locations.

3. The method, as recited in claim 2, wherein a handwritten character, which has been completely written, designated as a special case character, can constitute part of another character, the method of obtaining from said memory a set of digital signal representing said special case character where, at the completion of writing said special case character, the writing of a new character is begun comprising storing special code signals at the location in memory having a special code address comprised of part of an address read out of said memory at the completion of writing said special case character and the remainder of an address derived from the first direction signal generated in writing the first stroke of a new character, reading said special code signals out of said memory responsive to said code address, generating a fetch special signal in response to said special code signals, converting said fetch special signals into special case "remainder of an address" signals, combining said special case "remainder of an address" signals with the "part of an address" signals read out of said memory at the completion of writing said special case character to provide a complete address of the special case character representative signals in memory, reading said special case character representative signals out of memory in response to the complete address of said special case character, generating a new start signal responsive to said fetch special signal and to said special case character signals, converting said new start signal into new start "remainder of an address" signals, and combining said new start "remainder of an address" signals with the "part of an address" signals read out of said memory at the completion of writing said special case character to provide a complete address for addressing the first location of successive locations in memory for said new character.

4. The method, as recited in claim 2, wherein a handwritten character, which has been completely written, designated as a special case character, can constitute part of another character, the method of obtaining from memory a set of digital signals representing said special case character where at the completion of the writing thereof no new writing is begun comprising timing the interval over which said pen-down signal is not present, generating a timing signal when said interval exceeds a predetermined duration, converting said timing signal into remainder of address signals, combining said remainder of address signals with said part of address signals read out of said memory at the completion of writing said special case character to provide a complete address for the location in memory of said speical case character, and reading out of said memory in response to said complete address the digital signals representative of said special case character.

5. A method as recited in claim 2 including the method of detecting the writing of a period and obtaining a set of digital signals representative thereof from said memory comprising generating a pen-up signal each time the pen used for writing is lifted from paper, measuring the duration of the absence of a pen-up signal when said pen is applied to paper for writing following the generating of a start-up address, generating a period detected signal and a timing signal when said measurement of the duration of the absence of said pen-up signal is less than a predetermined amount, generating a part of an address of the location in memory of a set of digital signals representing a period, responsive to said period detected signal, generating the remainder of an address of the location in memory of a set of digital signals representing a period, responsive to said timing signal, combining said part of an address and remainder of an address to obtain the complete address of a location in memory wherein digital signals representative of a period, (.), are stored, and addressing said memory with said complete address to read out therefrom digital signals representative of a period, (.).

6. A system for generating a set of digital signals representative of a handwritten character comprising:

pen means for generating a sequence of direction signals, each direction signal representing a direction taken by a pen in writing a character, and for generating a pen-down signal indicative of the fact that said pen is being applied to paper for writing, memory means for storing, for each character, at successive locations therein, part of the address required for addressing the next of said successive locations, with a final one of said locations storing a set of digital signals representative of a handwritten character, encoding means responsive to a direction signal from said pen means to convert it into the remainder of the address which together with part of an address is required for addressing a location in memory, means for generating a part of the address of a start-up address for addressing said memory, register means to which said encoding means is connected for combining a remainder of an address output from said encoding means with a part of an address to form an entire address for addressing said memory, means for applying said part of the address of a start-up address to said register means to be combined with the remainder of an address output of said encoding means to form an entire address, means for addressing said memory with the entire address content of said register means to read out from the location address in said memory the part of an address stored as said location, gate means to apply the part of an address read out from said memory to said register means to be combined with the next remainder of an address from said encoding means into an entire address, a utilization device, means responsive to a set of digital signals representative of a character being read out of said memory to apply said signals to said utilization device instead of to said register means, and means responsive to one of set of digital signals representative of a character being read out of said memory to cause said means for generating part of the address of a start-up address to function.

7. A system as recited in claim 6 which includes means for deriving from said memory a set of digital signals representative of a handwritten character, designated as a special case character, which can constitute part of another character, where at the completion of writing said special case character a new character is begun, comprising means to generate special code signals in repsonse to the first direction signal generated in writing the first stroke of said new character following the completion of said special case character, which means responsive to said special code signals to inhibit said gate means from entering said special code signals into said register means and to cause said encoding means to produce the remainder of an address which, together with the part of an address remaining in said register means, constitutes the entire address of digital signals representing said special case character, whereby in response to said entire address and memory means will provide a set of digital signals representative of said special case character.

8. A system as recited in claim 6 wherein said pen means generates direction signals for a handwritten character which has been completely written, designated as a special case character, which can constitute the direction signals for part of another character, said system including means for obtaining from said memory a set of digital signals representative of said special case character where at the completion of writing said special case character, the writing of a new character is begun comprising means for deriving special code signals from the location in memory addressed by said means for addressing said memory when said means for addressing contains an entire address which includes the part of an address read out of said memory at the completion of writing said special case character and the remainder of an address which is the output of said encoding means responsive to the first direction signal provided by said pen means in writing the first stroke of said new character, means responsive to said special code signals to inhibit said gate from entering said special code into said register means and to generate a fetch special signal, means for entering said fetch special signal into said encoding means to be encoded into a remainder of an address which together with the part of an address in said register means constitute the address of digital signals representing said special case character which has been written, means responsive to the read out of said special case character representative digital signals from memory and to said fetch special signal to generate a new start signal, means responsive to said new start signal to maintain in said register means the part of an address presently in said register means, and means to apply said new start signal to said encoding means to be encoded into the remainder of an address which together with said part of an address in said register means constitutes the address in memory indicated by the direction of the first stroke of the new character.

9. A system as recited in claim 6 wherein a handwritten character which is completed, designated as a special case character, can constitute part of another character, said system including means for obtaining from memory a set of digital signals representative of said special case character when at the completion of the writing thereof no new character is begun comprising special case counter means, means for clearing said special case counter means to its zero count state in response to the part of the address of a start-up address derived form said memory at the conclusion of writing said special case character, means responsive to the absence of a pen-down signal to enable said special case counter to count up, means responsive to said special case counter means attaining a predetermined count to generate a timing signal, and means to apply said timing signal to said encoding means to be encoded into the remainder of an address which when combined with the part of an address in said register means is the address in said memory of the location of digital signals representative of said special case character whereby said special case character location may be addressed and said digital signals are read out of said memory.

10. A system as recited in claim 6 including means for obtaining from said memory a set of digital signals representing the writing of a period, (.), comprising period counter means, means to clear said period counter means to its zero count state in response to said part of the address of a start-up address, means responsive to a pen-down signal following the clearing of said period counter means to enable said counter to count over the interval of said pen-down signal to measure said interval, period gate means, responsive to said counter means commencing to count, to the termination of said pen-down signal and to said period counter means being less than a predetermined count state, to generate a timing signal and a period detected signal, means responsive to said period detected signal to clear that part of said register means which stores part of an address and to inhibit said gate means from applying a part of an address to said register means, means to apply said timing signal to said encoding means to be encoded into the remainder of an address which when combined with the part of an address in said register is the address in said memory means of digital signals representing a period (.), means responsive to the read out of digital signals representative of a period, (.), from said memory means to cause said means for generating a paart of the address of a start-up address to function, and clock means for terminating said period detected and timing signals after said digital signals representative of a period have been read out of said memory means.

11. A system as recited in claim 6 wherein said pen means includes means for separately generating first, second, third, and fourth signals respectively representative of motion by said pen means, while writing, in first, second, third, and fourth quadrants, means for adding first and second signals to produce a fifth signal, means for adding third and fourth signals to produce a sixth signal, means for subtracting said fifth from said sixth signal to produce a Y signal representative of motion in a vertical direction, means for adding first and third signals to produce a seventh signal, means for adding second and fourth signals to produce an eighth signal, means for subtracting said eighth from said seventh signal to produce an X signal representative of horizontal direction, first comparator means for comparing said Y signal with a predetermined amount of said X signal and producing a first output signal when said Y signal exceeds said predetermined amount of said X signal, second comparator means for comparing said X signal with a predetermined amount of said Y signal and producing a second output signal when said X signal exceeds said predetermined amount of said Y signal, vertical gate means responsive to said first output signal to enable application of said Y signal to said encoding means, horizontal gate means responsive to said second output signal to enable application of said X signal to said encoding means, and means responsive to the absence of an output from both said vertical gate means and said horizontal gate means to prevent entry of the part of an address last read out from memory into said register means and to prevent entry of the remainder of an address into said register means from said encoding means.

* * * * *